Inventor
Roscoe Beringer

Patented Sept. 15, 1931

1,823,421

UNITED STATES PATENT OFFICE

ROSCOE BERINGER, OF DETROIT, MICHIGAN, ASSIGNOR TO GENERAL MOTORS CORPORATION, OF DETROIT, MICHIGAN, A CORPORATION OF DELAWARE

FOUR SPEED TRANSMISSION

Application filed October 27, 1926. Serial No. 144,471.

This invention relates to transmission gearing and has been designed especially for motor vehicles.

The object of the invention is to so arrange the drive from the clutch shaft to the transmission shaft that four forward speeds may be had, the fourth or highest of which is a direct drive and the next lower is the drive through internal gearing.

In the conventional transmission gearing the drive for a speed next below the direct drive is through external spur gears and is objectionable because of its noise. It has heretofore been proposed to add a step-up gear train for a ratio higher than the direct drive and to employ in this connection internal gearing. The arrangement herein disclosed aims to enable the driver to use a direct drive for his highest speed and a comparatively noiseless train of internal gearing for his next lowest drive. By this means a higher ratio may be used at the rear axle and the highest speed available may be a direct drive with a shift to a noiseless third speed.

The objects are obtained by the structure shown in the accompanying drawings and described below.

Figures 1, 2:
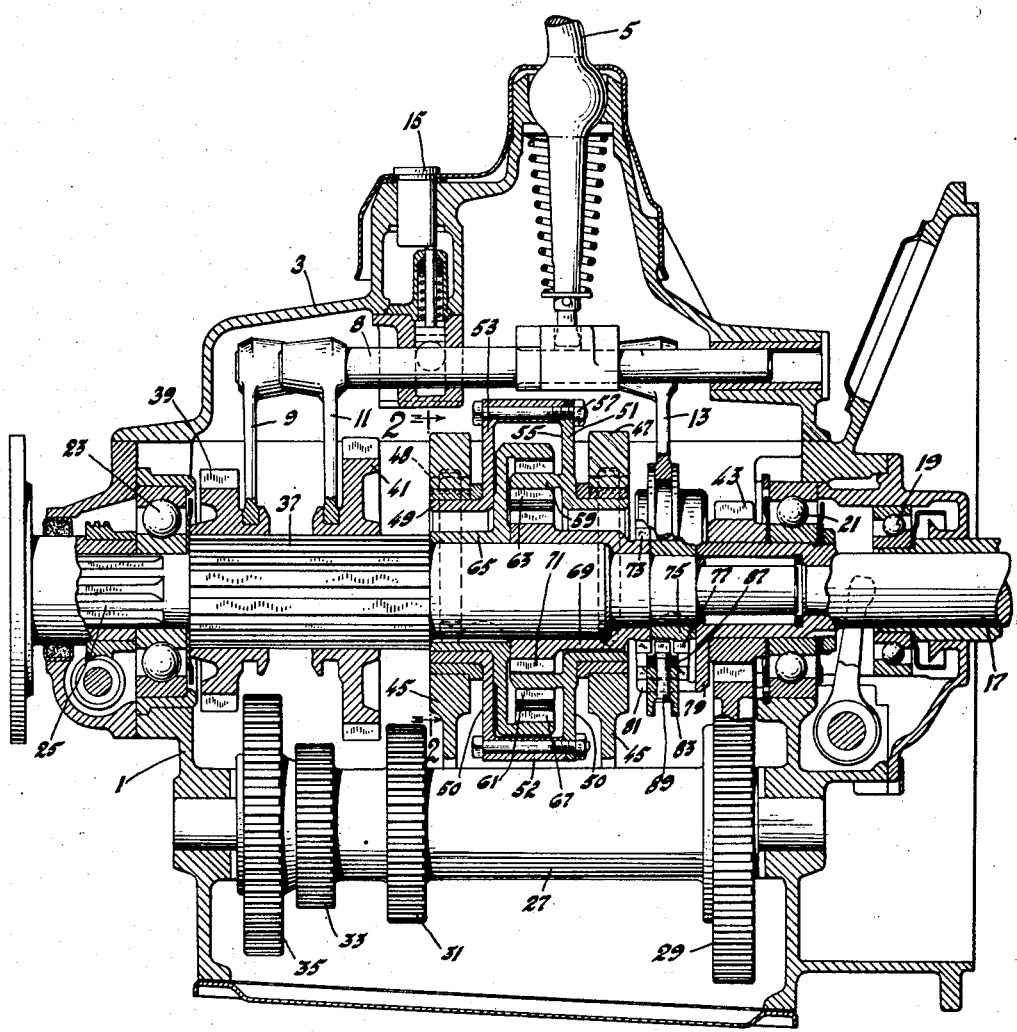
Figure 1 is a longitudinal section of a transmission housing incorporating my improved gearing.
Figure 2 is a transverse section on line 2—2 of Figure 1.

Referring by reference characters to the drawings, numeral 1 represents a transmission housing having a cover 3. Numeral 5 represents the usual gear shift lever and 8 one of a series of parallel rods moved by lever 5. The rods employ shift forks 9, 11 and 13 operable as explained below. The cover 3 carries a lock 15 which is not described in as much as it is no part of the invention. It may be added that an interlock could be employed between the several shifting rods. The interlock, however, being no part of the invention and is not shown.

Entering the casing 1 at its front end is a shaft 17, which shaft is as usual driven by the vehicle clutch. This shaft is rotatably supported by bearings 19 and 21. At the rear end of the housing bearings 23 journal a transmission shaft 25. The front end of the shaft 25 telescopes within the rear end of shaft 17. Beneath the aligned shafts 17 and 25 is the counter shaft 27 carrying a fixed driven gear 29 and also gears 31, 33 and 35 for driving the transmission shaft. An idler gear, not shown, is used and engages gear 33 for the reverse drive. At the rear end the transmission shaft is splined as at 37 and slidable on the splines are gears 39 and 41. Gear 39 engages gear 35 for driving at an intermediate speed. Gear 41 engages gear 31 for driving at low speed, and engages the idler in rotatable engagement with gear 33 when driving in reverse. On the clutch shaft 17 is a gear 43 in engagement with gear 29 whereby the countershaft is driven.

Secured to or integral with the casing are two brackets 45. These brackets are shaped to straddle the countershaft. Associated with each bracket is a cap 47. The caps are secured to the brackets by bolts 48. Openings in the caps and brackets inclose the aligned driving and driven shafts but the circular opening is eccentric, as shown. Rotatable in said eccentric opening, bearings 49 being provided, is a barrel gear 51. This gear is formed of two halves 53 and 55 secured together by bolts 57. Each half has a horizontal annular ring engaging the bearing 49 and an extended vertical flange 50. One of the vertical flanges has an annular extension 52, thus spacing the two vertical flanges for the purpose of forming the barrel which houses an internal gear train.

The other vertical flange has an inwardly directed annular flange 59 having external teeth 61 and internal teeth 63. Rigidly secured to the driven transmission shaft 25, as by a key, is the hub of a gear 65. Gear 65 has internal over-hanging teeth 67 engaging external teeth 61. Rotatable upon the driven shaft is a sleeve 69 having in radial alignment with gears 61, 63 and 67 teeth 71 engaging teeth 63. It will be observed that these internal gear trains have all their teeth in radial alignment and the gear train as a whole is located between the two sets of bearings 49 and within the barrel gear. A very sturdy support is thus afforded for the internal gear trains.

The sleeve 69 extends outside the barrel where it is provided with clutch teeth 73. Adjacent the end of the driven shaft and adjoining the end of sleeve 69 is a clutch member 75 which is keyed to the driven shaft and provided with external clutch teeth 77 positioned at one end of the gear, thereby affording a neutral space between teeth 73 and teeth 77. The driving shaft has a flange 79 from which extends a slotted annular portion 81. Externally of said slotted extension slides a collar 83 moved by the shifter fork 13 carried by one of the shifter rods. Arranged to slide but not rotate within the slotted extension is a clutch member 87 having teeth to engage either 73 or 77. Pins, one of which is shown at 89, pass through the slots and secure the collar to the clutch member 87.

The operation will be readily understood. The countershaft is constantly driven by means of gears 43 and 29. Movement of gears 39 and 41 by suitable lever movements effect a drive in intermediate, low or reverse. A direct drive is had by clutching together shafts 17 and 25. This is accomplished by actuating collar 83 from a central non-driving position to effect the engagement of clutch member 87 with teeth 77. To secure a step-down drive through the internal gearing having a ratio higher than the intermediate drive collar 83 is shifted from a neutral central position to engage clutch member 87 with teeth 73 of the sleeve 69. It will be observed that this shift is selective.

By the arrangement described it will be seen that the direct drive may be associated with a more favorable rear end ratio than would otherwise be possible. The drive through the internal gearing will be available to correspond with the more common high speed drive and will be of use for moderate grades while the direct drive will be used on long stretches of level roads. The fact that the step-down is through internal gearing renders it a comparatively quiet drive and it will not be objectionable as is the present noisy second speed.

I claim:

In a transmission device, a driving shaft, a driven shaft, two spaced brackets within said housing, said brackets having aligned circular openings eccentrically positioned relative to said aligned shafts, a barrel shaped gear rotatable in said bracket openings, one of the heads of said barrel having an inwardly directed annular flange provided with external teeth and with internal teeth, a gear secured to said driven shaft and within said barrel having a flange with internal teeth engaging the external teeth of the said barrel flange, a sleeve rotatable about said driven shaft having a hub extending within said barrel with external teeth engaging the internal teeth of said eccentric flange, the sleeve externally of said barrel having external teeth, means rotatable with the driving shaft to clutch said driving shaft directly to said driven shaft or to said rotatable sleeve.

In testimony whereof I affix my signature.

ROSCOE BERINGER.